United States Patent [19]

Tatkov et al.

[11] 4,032,256

[45] June 28, 1977

[54] CENTRIFUGAL PUMP

[76] Inventors: Viktor Arsentievich Tatkov, prospekt Tsiolkovskogo, 67 kv. 9; Nikolai Nikolaevich Letov, ulitsa Transportnaya, 105, kv. 81, both of Novokuznetsk, Kemerovskoi oblasti, U.S.S.R.

[22] Filed: Nov. 14, 1975

[21] Appl. No.: 632,169

[52] U.S. Cl. .......................... 415/198.1; 417/407; 415/97; 403/259
[51] Int. Cl.² ........................................ F04D 17/08
[58] Field of Search .................... 415/198, 98, 97; 416/199, 244 A; 403/259, 261, 270; 417/407

[56] References Cited

UNITED STATES PATENTS

| 872,883 | 12/1907 | Adams | 403/261 |
|---|---|---|---|
| 1,029,950 | 6/1912 | Schulz | 403/259 |
| 1,448,925 | 3/1923 | Fulton et al. | 415/198 |
| 1,918,359 | 7/1933 | Weis | 415/198 |
| 3,157,991 | 11/1964 | Kemenczky | 415/198 |
| 3,601,501 | 8/1971 | Johnson et al. | 416/244 A |
| 3,749,516 | 7/1973 | Samurin et al. | 416/199 |

FOREIGN PATENTS OR APPLICATIONS

| 403,600 | 11/1909 | France | 403/259 |
|---|---|---|---|
| 1,108,299 | 10/1955 | France | 416/244 A |
| 1,183,804 | 2/1959 | France | 416/244 A |
| 28,135 | 1907 | United Kingdom | 403/261 |

*Primary Examiner*—Henry F. Raduazo

[57] ABSTRACT

A pump for handling liquids laden with abrasive particles having impellers arranged in a counter-opposed manner on the pump shaft to rotate jointly with the latter. At the points of impeller mounting, the shaft has tapered surfaces whose apices face each other and the mating surfaces of the impellers are also tapered. At least one of the tapered surfaces of the shaft is formed by a bushing disposed with provision for moving axially along said shaft for pressing the impellers against the corresponding tapered surfaces of the shaft. This mode of mounting the impellers extends considerably the service life of the pump.

4 Claims, 4 Drawing Figures

CENTRIFUGAL PUMP

The present invention relates to centrifugal pumps.

The improvement proposed by the present invention can be used to best advantage in centrifugal two-stage pumps.

The centrifugal pumps according to the invention will be most beneficial in mining, metallurgical, chemical and construction industries for handling liquids with suspended abrasive particles, i.e., pulp.

Widely known in the art are centrifugal two-stage pumps comprising impellers mounted on the shaft in a counter-opposed manner, i.e., with their suction channels directed away from each other.

The impellers are key-mounted on the shaft for joint rotation with the latter. Axial fixing of the impellers relative to the shaft is ensured by providing the shaft, at one side thereof, with a collar which engages one of the impellers while the opposite end of the shaft has a nut whose face engages the other impeller. Arranged between the impellers is a spacer bushing.

Such pumps are used mainly for handling homogeneous liquids and are unsuited for pumping liquids laden with abrasive matter. The provision of through keyways in the impeller hubs prevents reliable sealing of the shaft and makes it impossible to avoid erosion of the mating surfaces of the shaft and impellers. During operation this results in loosening and vibration of the impellers. The non-uniform wear of the impellers intensifies their unbalance which produces the unbalanced lateral forces contributing still further to loosening of the impellers on the shaft. All these factors curtail the life of the pump considerably and impair its reliability in pumping abrasive pulp.

The impellers of pulp pumps are made of hard wear-resistant materials which are difficult to machine and especially to effect the planing required for cutting of the keyway. This increases the difficulties of the pump manufacture and raises its cost.

An object of the present invention is to provide a centrifugal pump wherein the impellers are mounted on the shaft in such a manner as to extend the pump life.

Another object of the present invention is to promote the operational reliability of the pump.

Still another object of the present invention is to simplify the manufacture of the impellers, particularly those made of hard wear-resistant materials.

In accordance with these and other objects there is provided a centrifugal two-stage pump with impellers mounted on the shaft in a counter-opposed manner for rotating together therewith wherein, according to the invention, the shaft has at the points of impeller mounting, tapered surfaces whose apices face each other while the mating surfaces of the impellers are also tapered, at least one of the tapered surfaces of the shaft being formed by a bushing arranged on the shaft with provision for moving axially in operation for pressing the impellers against the corresponding tapered surfaces of the shaft.

It is practicable that the bushing be connected with the shaft by a screw joint.

This connection of the bushing with the shaft ensures constant pressing of the impellers against the corresponding surfaces of the rotating shaft.

It is no less practicable for the shaft at the point of bushing location to be provided with a radially positioned pin and the face of the bushing opposite to the face adjoining the tapered surface be provided with a slant surface engaging said pin during pump operation.

This connection of the bushing with the shaft is simplest from the viewpoint of design and guarantees reliable pressing of the impellers against the corresponding tapered surfaces of the shaft in pumps of a comparatively small capacity.

The centrifugal pump realized according to the present invention features a higher operational reliability and longer life than the known pumps of this type. This allows such pumps to be used for hydraulic conveyance of solid free-flowing materials, e.g., coal, shale, by-products of ore-dressing plants, etc.

Now the invention will be described in detail by way of example with reference to the accompanying drawings, in which.

Figure 1:
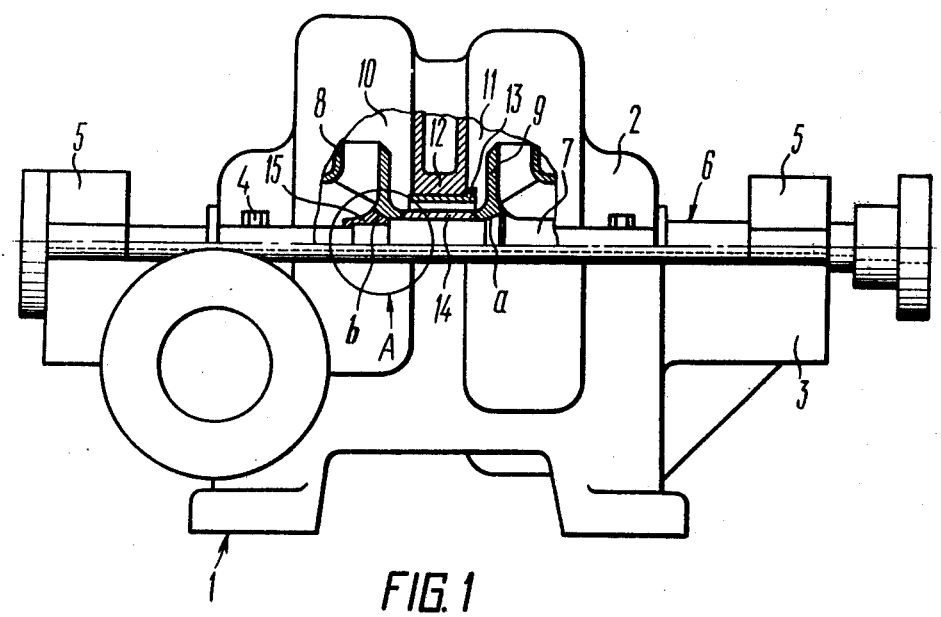
FIG. 1 illustrates the centrifugal two-stage pump according to the invention with a partial cutout to the axis of symmetry.

The centrifugal two-stage pump comprises a casing 1 (FIG. 1) consisting of an upper portion 2 and a lower portion 3 which are coupled together by clamping members 4. Installed in the casing 1 on bearings 5 is a rotor 6. The rotor comprises a shaft 7 carrying impellers 8, 9. The impellers 8, 9 are accommodated in chambers 10 and 11 of the low- and high-pressure stages, respectively. The chambers 10 and 11 are separated from each other by the wall 12 of the casing 1. The wall 12 has a hole for the passage of the shaft, said hole being provided with a rigidly secured bushing 13 protecting the wall against wear.

The impellers 8 and 9 are mounted in a counter-opposed manner on the shaft 7 with a spacer bushing 14 located therebetween.

Figure 2:
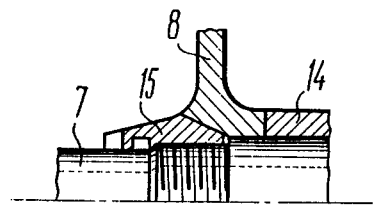
FIG. 2 is a detail of fragment A in FIG. 1, on enlarged scale.

At the points of mounting of the impellers 8 and 9, the shaft 7 has tapered surfaces $a$ and $b$ whose apices face each other. The mating surfaces of the impellers 8, 9 are also tapered. The tapered surface $b$ of the shaft 7 is formed by a bushing 15 secured to the shaft by a screw as shown in FIG. 2. The threads of this screw joint are directed towards the apices of the tapered surfaces of the shaft 7 if the helix angle is counted in the direction of regular rotation of the shaft 7 during pump operation.

Figure 3:
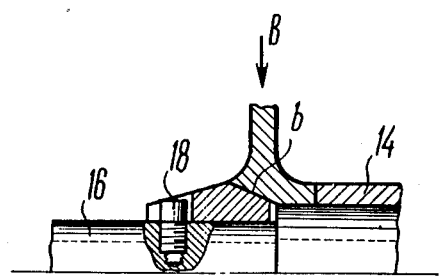
FIG. 3 shows another embodiment of the fastening of the bushing on the shaft.
Figure 4:
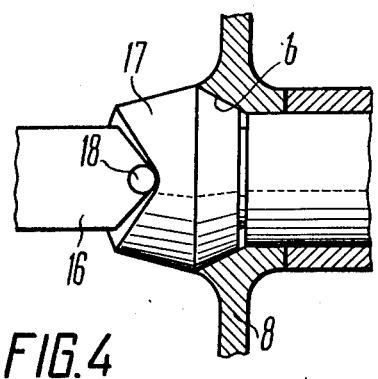
FIG. 4 is a view along arrow B in FIG. 3 in a section through the impeller.

In another embodiment of the invention, the shaft 16 (FIGS. 3, 4) and the bushing 17 are connected as follows. At the point of location of the bushing 17 the shaft 16 has a radially secured pin 18 while the face of the bushing 17 opposite to the face adjoining the tapered surface $b$ has an inclined V-shaped surface positioned at an angle to the plane which is perpendicular to the shaft 16. The pin 18 rests of the apex of on the V-shaped surface as can be seen in FIG. 4 and engages therewith during pump operation.

The centrifugal two-stage pump operates as follows.

As the rotor 6 revolves, rotation of the impellers 8 and 9 is resisted by the fluid contained in the chambers 10 and 11. If the screw joint between the shaft 7 and bushing 15 is not tightened, the frictional engagement at the surface $b$ will prove insufficient for rotating the impeller 8 at the speed of the shaft 7. The impeller 8 will lag behind, thus braking the bushing 15 relative to the shaft 7. As a consequence, the shaft 7 will turn in the bushing 15, moving it towards the other tapered surface *a* of the shaft 7. In view of the fact that the impellers 8, 9 thrust apart by the bushing 14 retain a constant distance between each other, first the tapered mounting surfaces of the shaft 7 will contact the corresponding surfaces of the impeller 8 and 9 followed by an increase in the specific pressure on these surfaces. As soon as the specific pressure on the tapered surfaces *a* and *b* of the shaft 7 and on those of the impellers 8, 9 becomes sufficient for developing frictional engagement equal to the torque of the impellers 8, 9, the bushing 15 will stop slipping and the impellers 8 and 9 will start rotating jointly with the shaft 7, at the same angular speed.

In other respects the centrifugal two-stage pump functions similarly to the known pumps of this type.

In the other embodiment of fastening the bushing 17 on the shaft 16, the mating tapered surfaces are tightened similarly due to the interaction of the pin 18 with the inclined flanks of the V-shaped surface of the bushing 17.

An experimental model of the two-stage centrifugal pump according to the present invention has been installed in a coal mine for hydraulic lifting of coal. It has provided 1000 hrs. of working time before rotor replacement. This long service life of the rotor has been achieved through the use of the present invention because the operation of the rotors of the old design had been limited to 300 hrs. of working time.

What we claim is:

1. In a centrifugal pump having a casing, a shaft mounted in said casing, impellers mounted on said shaft in a fixed position relative to each other and secured on the shaft for rotation therewith and spacer means on said shaft between said impellers for engaging said impellers to hold the same said shaft at the points of mounting of said impellers has tapered surfaces whose apices face each other, the mating surfaces of said impellers also being tapered, at least one of the tapered surfaces of said shaft being formed by a bushing on said shaft, and means mounting said bushing on said shaft with the provision for axial movement in operation in order to press the impellers against the corresponding tapered surfaces of the shaft.

2. A centrifugal pump according to claim 1 wherein said means mounting the bushing on the shaft comprises a threaded connection.

3. A centrifugal pump according to claim 1 wherein said means mounting the bushing on the shaft comprises a radially secured pin on said shaft, said bushing having a surface remote from the surface adjoining the tapered surface of the shaft, said remote surface being inclined with respect to the axis of rotation of said shaft and engaging and pin during pump operation.

4. A centrifugal pump according to claim 3 wherein said remote surface is V-shaped.

* * * * *